US011528191B1

(12) United States Patent
Ficara et al.

(10) Patent No.: US 11,528,191 B1
(45) Date of Patent: Dec. 13, 2022

(54) AUTOMATIC RESOLUTION OF CONFIGURATION INCONSISTENCIES

(71) Applicant: Cisco Technology, Inc., San Jose, CA (US)

(72) Inventors: Domenico Ficara, Essertines-sur-Yverd (CH); Roberto Muccifora, Ropraz (CH); Andriani Stylianou, Lausanne (CH); Shankar Sthanuretnam, Bangalore (IN); Pratap Pereira, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/403,585

(22) Filed: Aug. 16, 2021

(51) Int. Cl.
  *H04L 41/0869* (2022.01)
  *H04L 41/08* (2022.01)
  *H04L 41/0604* (2022.01)
  *H04L 41/0816* (2022.01)

(52) U.S. Cl.
  CPC ...... *H04L 41/0869* (2013.01); *H04L 41/0627* (2013.01); *H04L 41/0816* (2013.01); *H04L 41/0883* (2013.01)

(58) Field of Classification Search
  None
  See application file for complete search history.

(56) References Cited

U.S. PATENT DOCUMENTS

| | | | |
|---|---|---|---|
| 8,127,275 B1 * | 2/2012 | Hampapuram | G06F 8/30 717/124 |
| 10,514,978 B1 | 12/2019 | Lee et al. | |
| 2015/0349807 A1 * | 12/2015 | Vernon | H03M 13/1108 714/774 |
| 2016/0063050 A1 | 3/2016 | Schoen et al. | |
| 2018/0316560 A1 * | 11/2018 | Malliga | G06F 30/34 |
| 2019/0129701 A1 | 5/2019 | Hawrylo et al. | |
| 2019/0278936 A1 | 9/2019 | Resch | |
| 2020/0125743 A1 * | 4/2020 | Gopalakrishna | G06F 16/9024 |

\* cited by examiner

*Primary Examiner* — Joshua Joo
(74) *Attorney, Agent, or Firm* — Lee & Hayes, P.C.

(57) ABSTRACT

Techniques are described for automatically generating a consistent configuration state version 2 for a network device with no or minimal help from a user and/or from a provider of the network device when updating from a configuration state version 1 to the configuration state version 2. The techniques and architecture also provide for migration from configuration state version 1 to configuration state version 2 when at least some of a configuration state are located in text files that are applied to the network device at start-up of the network device.

16 Claims, 6 Drawing Sheets

AUTOMATIC RESOLUTION OF CONFIGURATION INCONSISTENCIES

TECHNICAL FIELD

The present disclosure relates generally to resolving configurations of network devices in a network.

BACKGROUND

Configuration states of network devices, e.g., routers, switches, wireless controllers, etc., are generally described in complex languages and they evolve over time. As a feature evolves or new features are introduced, new configuration needs arise and the data model for the configurations of the network devices needs to adapt. This may pose challenges when users upgrade from configuration version 1 to configuration version 2. The configuration set-up that in version 1 is consistent and valid may not be consistent and valid anymore when moving to configuration version 2 of the software. For this reason, there are some adaptations to the configuration state that need to be made. Sometimes users perform such adaptations for the configuration state manually. Other times, a provider of the network device may introduce some logic that provides the "migration" ability for the network device from configuration state version 1 to configuration state version 2. Unfortunately, sometimes the migration from configuration state version 1 to configuration state version 2 may be time consuming and may disrupt service for the user. Additionally, settings within the configuration state for the network device may not translate adequately. This can also lead to inconvenience and disruption of service for the user.

Sometimes users save configuration states and/or information of network devices in text files that are applied at start-up of the network devices. It is often the case that start-up configuration is only partially validated: the mere fact of applying a start-up configuration means that a network device is within a process that is "building" the configuration state and some pieces of the configuration state might be missing during the start-up process. Such limited capability might mean fabricated configuration states may be accepted and expose the network device to attacks or bugs (crashes, loss of service, etc.).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
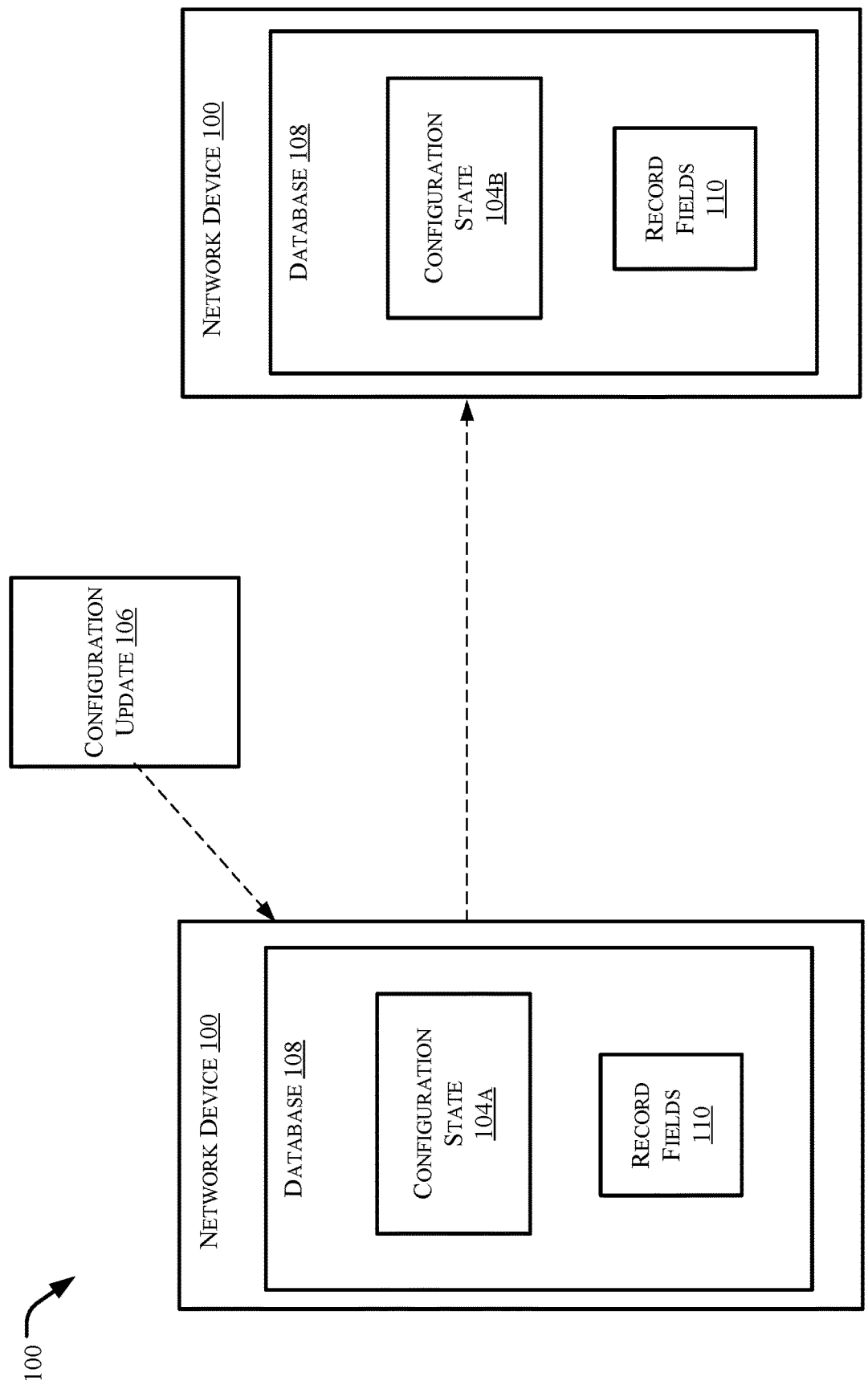
FIG. 1 schematically illustrates an example portion of a network that includes a network portion.

This disclosure describes techniques and architecture for automatically generating a consistent configuration state version 2 for a network device with no or minimal help from a user and/or from a provider of the network device when updating from a configuration state version 1 to the configuration state version 2. The techniques and architecture also provide for migration from configuration state version 1 to configuration state version 2 when at least some of a configuration state are located in text files that are applied to the network device at start-up of the network device. It is often the case that start-up configuration of a network device is only partially validated upon start-up. The mere fact of applying a start-up configuration means that the user is within a process that is "building" the configuration and some pieces might be missing during such process. Such limited capability might mean that fabricated configurations may be accepted by the and thus expose the network device to attacks or bugs (crashes, loss of service, etc.).

Configuration validation may be defined as a set of rules (e.g., rules defined in some domain specific language) that determine if some piece of a configuration of a network device is invalid. In particular, with a model base configuration, these rules express logical operations on the values of fields of a set of records. Such operations allow comparing fields value with some constant between them by means of simple operations such as string match, string length, math comparisons, etc.

Generally, configuration validation rules may be expressed in a functional format and may be executed upon a record create/update/delete operation. In embodiments, each rule may be considered an "assert" on logical conditions on records fields. An example may include the following: assert(R1.a==1 OR R1.b==2 AND R2.c==3). This means that a field "A" in record R1 needs to be equal to 1 or a field B in record R1 needs to be equal to 2 while a field C within record R2 is equal to 3. Should such a logical operation be false, then the assertion should not pass and the configuration should not be accepted.

Thus, with regard to the scenarios described above, when upgrading or changing from configuration state version 1 to configuration state version 2, a few of these validation rules that do not pass any more when the network device is operating using configuration state version 2 may occur and there will need to be some type of rectifying or fixing of the configuration database of the network device.

In embodiments, a configuration data-modeling language may be utilized generally that supports extensions in both validation rules and data fields. This allows for a common framework to inherit data from configuration state version 1 to configuration state version 2 and apply the validation rules from configuration state version 2 onto the data that has been inherited from configuration state version 1, e.g., the fields inherited from configuration state version 1.

Additionally, the configuration data modelling language supports "units" (seconds, milliseconds, bytes, kilobytes, hertz, megahertz, meters, dBm, watts, etc.). This allows for a preliminary phase where straightforward transformations are applied at the field level before applying the asserts, e.g., the validation rules. In such a preliminary phase, all fields whose "units" definition have changed will be transformed to keep the same original value. For example, a field may represent seconds in configuration state version 1 and then the same field is converted to milliseconds in configuration state version 2. In such a case, a straightforward multiplication factor given by the v2 and v1 units may make sure that the field in configuration state version 2 maintains the original meaning that was present within the configuration state version 1. For example, a multiplication factor of 1,000 may be provided when configuration state version 2 moves from seconds in configuration state version 1 to milliseconds in configuration state version 2. Accordingly, if a time in configuration state version 1 was equal to two seconds, then in configuration state version 2, the time should equal 2,000 milliseconds.

In embodiments, a model may be used to describe configuration state record fields as some of the nodes in a bipartite graph. If there is an assertion, similar to assertions previously mentioned herein, a node may be introduced in the bipartite graph on the other partition of the bipartite graph with links to the record fields that are part of the assertion logical expression. Thus, in such a model, if you have the following assertions:

X: assert(a==1 or b==2 or c==3);
Y: assert(b==2 and e==1); and
Z: assert(d==33 or e==2 and f==7), a bipartite graph may be drawn where a first layer of nodes represents assertions and a second layer of nodes represents fields. The representation of assertions and fields have similarities with low-density parity-check (LDPC) code representations. In particular, assertions are parity bits, fields are data bits, and validations may be sparse.

Briefly, in the mathematical field of graph theory, a bipartite graph (or bigraph) is a graph whose vertices can be divided into two disjoint and independent sets U and V such that every edge connects a vertex in U to one in V. Vertex sets U and V are usually called the parts of the graph. Equivalently, a bipartite graph is a graph that does not contain any odd-length cycles. The two sets U and V may be thought of as a coloring of the graph with two colors: if one colors all nodes in U blue, and all nodes in V green, each edge has endpoints of differing colors, as is required in the graph coloring problem. In contrast, such a coloring is impossible in the case of anon-bipartite graph, such as a triangle: after one node is colored blue and another green, the third vertex of the triangle is connected to vertices of both colors, preventing it from being assigned either color. One often writes G=(U, V, E) to denote a bipartite graph whose partition has the parts U and V, with E denoting the edges of the graph. If a bipartite graph is not connected, it may have more than one bipartition; in this case, the (U, V, E) notation is helpful in specifying one particular bipartition that may be of importance in an application. If |U|=|V|, that is, if the two subsets have equal cardinality, then G is called a balanced bipartite graph. If all vertices on the same side of the bipartition have the same degree, then G is called biregular.

In the above example for a bipartite graph of assertions and record fields, a missing portion of the model may be that the record fields are not all booleans in the network device configuration file and instead, there may be a large variety of types for the record fields.

In embodiments, the fields may be viewed as either having a default value or having a non-default value. If the current value for a field is the default value, then the corresponding data field may be set to one. If it is not a default value, then the corresponding data field value may be set to zero. This means that the assert conditions are "translated" such that the assert conditions compare whether the fields (A, B, C, . . . ) are one (default) or zero (non-default). Such a mapping is fairly straightforward and creates a complete mapping of validation rules to a bipartite parity-check graph.

However, if validation rules checking a given field, for example, "A," are not regularly comparing with default values, another approach may be to "explode" the field into multiple data bits by creating a data bit for each condition on field "A," and generate additional parity-check nodes that exclude the potential for having "A" in multiple values.

In embodiments, the data modeling language may be a rich data modeling language such as, for example, Yang, Tosca, Hot, etc. Such rich data modeling languages allow for database migration and straightforward translations during database migration. However, if the configuration data modeling language is not a rich data modeling language that allows for translations during database migration, then constraint solver code, as will be described further herein, may be used to make sure that data fields are within the proper range. Additionally, additional constraints, e.g., asserts, may be introduced into the validation model that represents deployment recommendations.

Thus, in embodiments, once the model has been defined, a configuration file needs to be mapped to a parity-check graph. In configurations, a low-density parity check (LDPC) decoding technique (belief propagation for example) may be applied to make the bipartite graph "happy," e.g., applying the LDPC decoding techniques is used to satisfy all of the validation nodes. The output of such a procedure results in a set of changes/fixes to the data bits for moving from configuration file version 1 to configuration file version 2. These changes may then be translated (by inverse mapping) to recreate some field value according to the binary value. The fields may then be fixed accordingly (setting them to default if needed or setting them to a specific value in the instances when fields may have a multiple value).

In embodiments, constraint solvers, e.g., constraint solver code, may be used that include importance tagging for configuration record fields. Constraint solvers, also known as constraint programming, is a paradigm for solving combinatorial problems that draws on a wide range of techniques from artificial intelligence, computer science, and operations research. With constraint solvers, users declaratively state the constraints on the feasible solutions for a set of decision variables. Constraints differ from the common primitives of imperative programming languages in that the constraints do not specify a step or sequence of steps to execute, but rather the properties of a solution to be found. In addition to constraints, users also need to specify a method to solve these constraints. This typically draws upon standard methods like chronological backtracking and constraint propagation but may use customized code such as a problem specific branching heuristic.

Thus, in such embodiments, a constraint solver code is used to work with the configuration validation expressions of the models and provide a set of valid configuration values that satisfy all conditions. The constraint solver code may be tuned to reduce exploration on a given set of parameters such that the changes to some specific critical record fields (that might change the entire purpose of the configuration state) are limited or blocked. This may require one more level of tagging for configuration record fields. The tagging may be manual, e.g., performed by a user, or automatic. Automatic tagging may improve the result and performance of the constraint solver code. The idea is to assign degrees of importance to configuration record fields automatically. Thus, graphic metrics may be used to define field importance (hence how little a particular record field should be varied in the constraint solving exercise). Examples of graph metrics to use include connectivity degree and betweenness centrality. Both measures indicate how much a node (hence the record field) contributes to relationships to other nodes of the bipartite graph. Thus, the more the record field is connected and relates to other record fields in the validation bipartite graphs, the more the record field is important to check its value to define the entire configuration of the network device. This means the node's contribution to what the configuration state is implementing is more extensive than other nodes.

Accordingly, in accordance with embodiments described herein, a method may include receiving, at a network device, a configuration startup update for the network device. The method may also include implementing, by the network device, the configuration update with respect to a first configuration state of the network device to provide a second configuration state of the network device. The method may further include determining, by the network device, one or more differences between the first configuration state of the network device and the second configuration state of the network device. In embodiments, the one or more differences may be determined by defining validation rules comprising multiple asserts and multiple record fields and mapping the validation rules to a bipartite graph. The method may also include rectifying, by the network device, one or more of the one or more differences between the first configuration state of the network device and the second configuration state of the network device. In embodiments, the one or more of the one or more differences may be rectified by applying low-density parity check (LDPC) decoding to the bipartite graph. In other embodiments, the one or more of the one or more differences may be rectified by applying an automatic constraint solver code to the bipartite graph.

In embodiments, the method may include tagging at least one record field of the first configuration state of the network device with an importance rating, the importance rating providing a degree of variance for the at least one configuration field with respect to the second configuration state of the network device.

Thus, the techniques and architecture described herein provide for automatically generating a consistent configuration state version 2 for a network device with no or minimal help from a user and/or from a provider of the network device when updating from a configuration state version 1 to the configuration state version 2. The techniques and architecture also provide for migration from configuration state version 1 to configuration state version 2 when at least some of a configuration state are located in text files that are applied to the network device at start-up of the network device. The techniques include mapping of a configuration model to a parity-check graph for automatic invalid configuration fixing that may be used with LDPC decoding techniques. Two different mapping models from configuration model to binary format for parity-check graph are also provided. Configuration migration problems or invalid startup configuration problems are solved automatically with no feature-specific code or manual interventions.

The techniques described herein may be performed by a system and/or device having non-transitory computer-readable media storing computer-executable instructions that, when executed by one or more processors, performs the method described above.

EXAMPLE EMBODIMENTS

FIG. 1 schematically illustrates a portion of a network 100. The network 100 includes a network device 102, e.g., a router, a switch, a wireless controller, etc. Generally, the network 100 includes multiple network devices 102. The network device 102 includes software and/or firmware that defines a configuration state. The network device 102 may receive an update 106 for the configuration state that may update the configuration state from configuration state version 104a (configuration state version 1) to configuration state version 104b (configuration state version 2). The update 106 may be provided by a provider of the network device 102, e.g., a supplier, a manufacturer, etc. or a user of the network device 102, e.g., a user, an owner, etc. The update 106 may be received and executed during operation of the network device 102 or may be executed at start-up of the network device 102, either onetime or each time the network device starts up. The updating of the configuration state generally needs to be validated to help ensure that settings within the configuration state for the network device 102 translate adequately. In embodiments, the network device 102 includes a configuration database 108 that includes the configuration state and record fields 110. The configuration database 108 may be implemented in memory of the network device 102.

As previously noted, configuration validation of the configuration state may be defined as a set of rules (e.g., rules defined in some domain specific language) that determine if some piece of a configuration of the network device 102 is invalid. In particular, with a model base configuration, these rules express logical operations on the values of fields of a set of records. Such operations allow comparing fields value with some constant between them by means of simple operations such as string match, string length, math comparisons, etc.

Generally, configuration validation rules may be expressed in a functional format and may be executed upon a record create/update/delete operation. In embodiments, each rule may be considered an "assert" on logical conditions on records fields. An example may include the following: assert(R1.a==1 OR R1.b==2 AND R2.c==3). This means that a record field "a" in record R1 needs to be equal to 1 or a record field b in record R1 needs to be equal to 2 while a record field c within record R2 is equal to 3. Should such a logical operation be false, then the assertion should not pass and the configuration should not be accepted.

Thus, with regard to the scenarios described above, when upgrading from configuration state version 104a to configuration state version 104b, a few of these validation rules that do not pass any more when the network device is operating using configuration state version 2 may occur and there will need to be some type of rectifying or fixing of the configuration database.

In embodiments, a configuration data-modeling language may be utilized generally that supports extensions in both validation rules and data fields. This allows for a common framework to inherit data from configuration state version 104a to configuration state version 104b and apply the validation rules from configuration state version 104b onto the data that has been inherited from configuration state version 104a, e.g., the fields inherited from configuration state version 104a.

Additionally, in embodiments, the configuration data modelling language supports "units" (seconds, milliseconds, bytes, kilobytes, hertz, megahertz, meters, dBm, watts, etc.). This allows for a preliminary phase where straightforward transformations are applied at the field level before applying the asserts, e.g., the validation rules. In such a preliminary phase, all fields whose "units" definition have changed will be transformed to keep the same original value. For example, a field may represent seconds in configuration state version 1 and then the same field is converted to milliseconds in configuration state version 104*b*. In such a case, a straightforward multiplication factor given by the configuration state version 104*b* and configuration state version 104*a* units may make sure that the field in configuration state version 104*b* maintains the original meaning that was present within the configuration state version 1. For example, a multiplication factor of 1,000 may be provided when configuration state version 104*b* moves from seconds in configuration state version 104*a* to milliseconds in configuration state version 104*b*. Accordingly, if a time in configuration state version 104*a* was equal to two seconds, then in configuration state version 104*b*, the time should equal 2,000 milliseconds.

Figure 2:
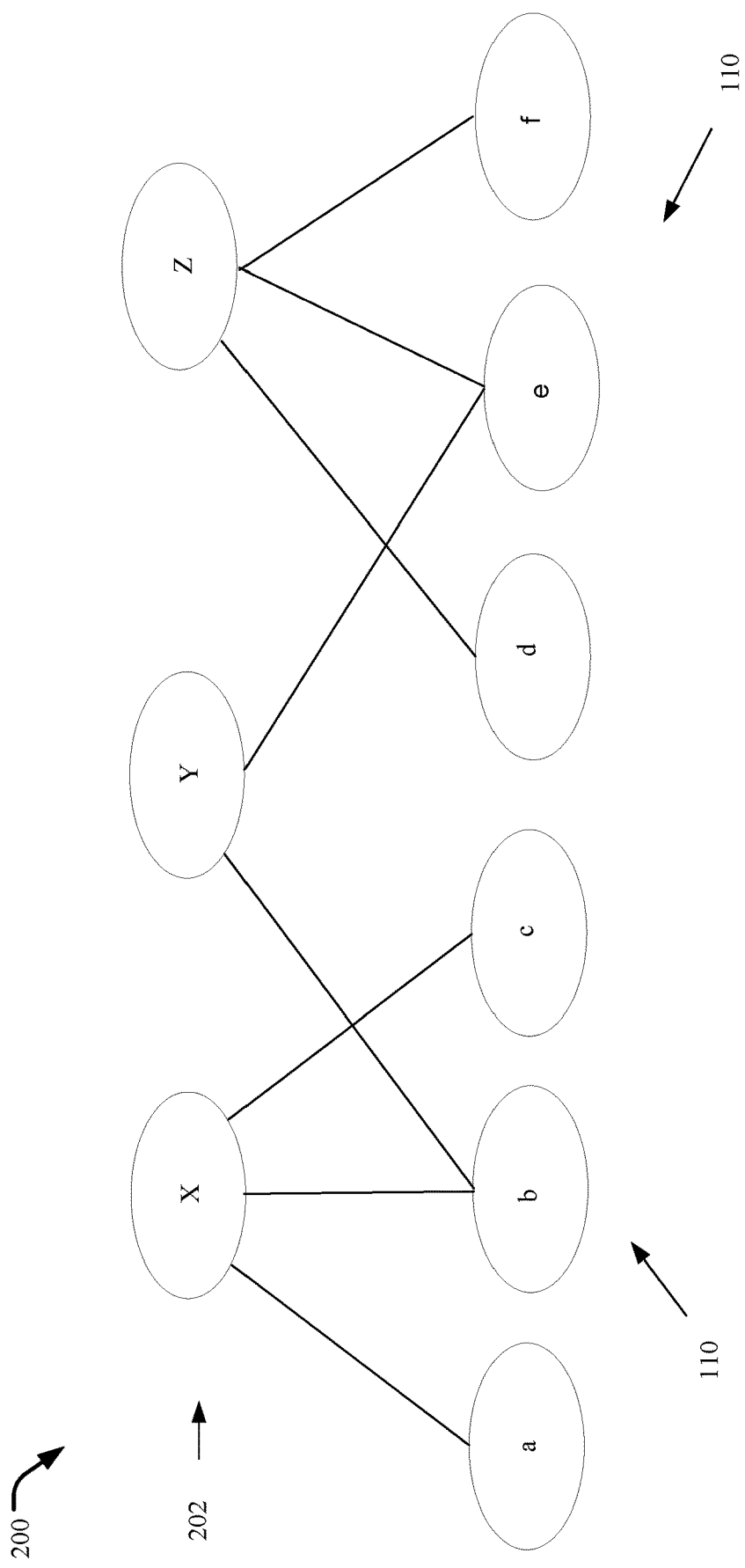
FIG. 2 schematically illustrates an example of a validation bipartite graph for validating a configuration state update for the network device of FIG. 1.

In embodiments, a model may be used to describe configuration state record fields 110 as some of the nodes in a bipartite graph 200 as can be seen in FIG. 2. If there is an assertion, similar to assertions previously mentioned herein, a node may be introduced in the bipartite graph on the other partition of the bipartite graph with links to the record fields that are part of the assertion logical expression. Thus, in such a model, if there are the following assertions:

X: assert(a==1 or b==2 or c==3);
Y: assert(b==2 and e==1); and
Z: assert(d==33 or e==2 and f==7), a bipartite graph may be drawn where a first layer of nodes X, Y, and Z represents assertions 202 and a second layer of nodes a, b, c, d, e, and f represents record fields 110. The representation of assertions 202 and record fields 110 have similarities with low-density parity-check (LDPC) code representations, as will be discussed further herein. In particular, assertions 202 are parity bits, record fields 110 are data bits, and validations may be sparse.

As previously noted, in the mathematical field of graph theory, a bipartite graph (or bigraph) is a graph whose vertices can be divided into two disjoint and independent sets U and V such that every edge connects a vertex in U to one in V. Vertex sets U and V are usually called the parts of the graph. Equivalently, a bipartite graph is a graph that does not contain any odd-length cycles. The two sets U and V may be thought of as a coloring of the graph with two colors: if one colors all nodes in U blue, and all nodes in V green, each edge has endpoints of differing colors, as is required in the graph coloring problem. In contrast, such a coloring is impossible in the case of a non-bipartite graph, such as a triangle: after one node is colored blue and another green, the third vertex of the triangle is connected to vertices of both colors, preventing it from being assigned either color. One often writes G=(U, V, E) to denote a bipartite graph whose partition has the parts U and V, with E denoting the edges of the graph. If a bipartite graph is not connected, it may have more than one bipartition; in this case, the (U, V, E) notation is helpful in specifying one particular bipartition that may be of importance in an application. If |U|=|V|, that is, if the two subsets have equal cardinality, then G is called a balanced bipartite graph. If all vertices on the same side of the bipartition have the same degree, then G is called biregular.

In embodiments, the record fields 110 may be viewed as either having a default value or having a non-default value. If the current value for a field is the default value, then the corresponding data field may be set to one. If it is not a default value, then the corresponding data field value may be set to zero. This means that the assert conditions are "translated" such that the assert conditions compare whether the record fields (a, b, c, . . . ) are one (default) or zero (non-default). Such a mapping is fairly straightforward and creates a complete mapping of validation rules to a bipartite parity-check graph as may be seen in FIG. 2.

In the above example, a missing portion of the model may be that the record fields 110 are not all booleans in the network device 102 configuration file and instead, there may be a large variety of types for the record fields 110.

Figure 3:
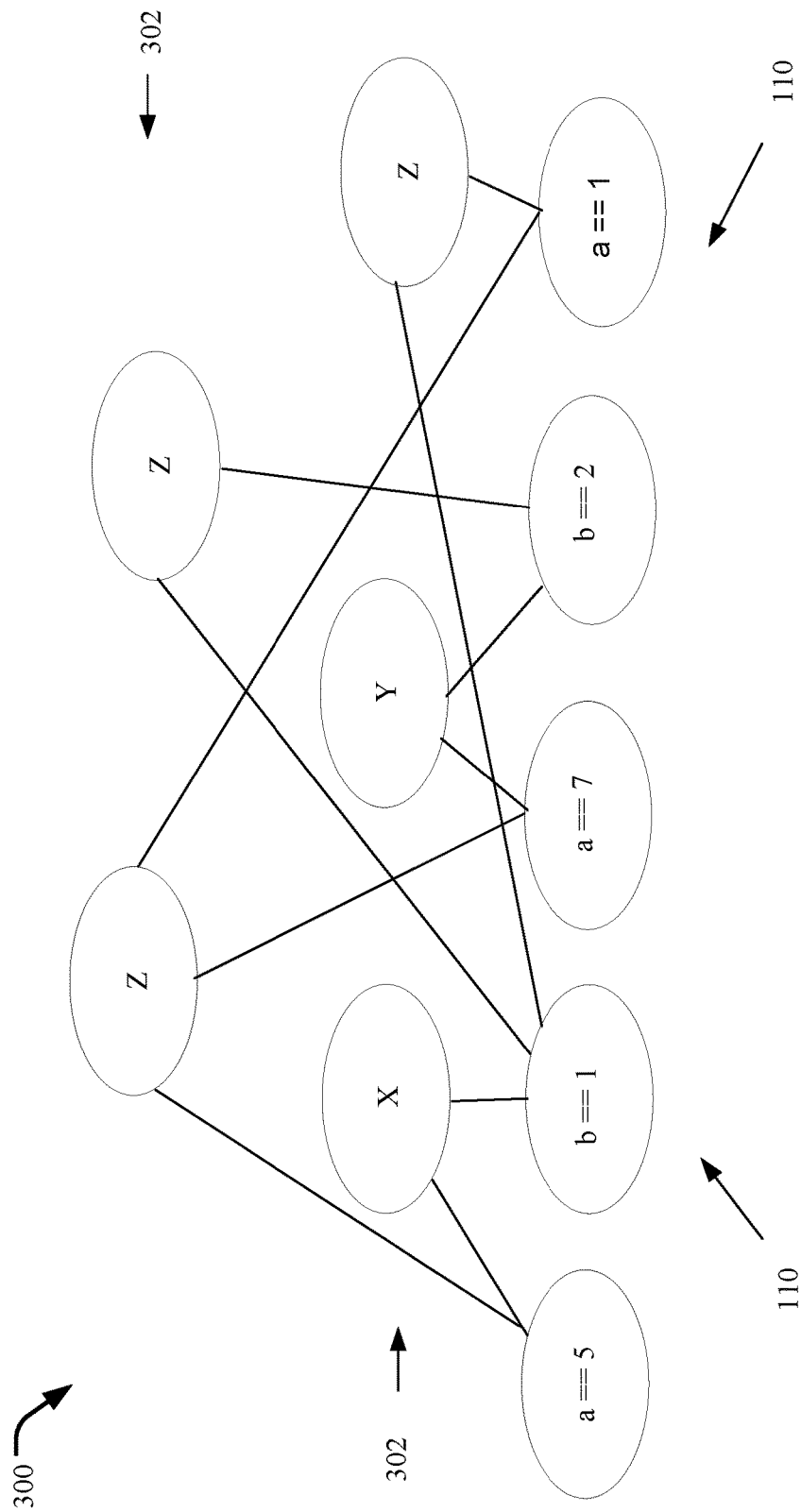
FIG. 3 schematically illustrates another example of a validation bipartite graph for validating a configuration state update for the network device of FIG. 1.

Thus, if validation rules checking a given record field 110, for example, "a," are not regularly comparing with default values, another approach may be to "explode" the record field 110 into multiple data bits by creating a data bit for each condition on record field "a," and generate additional parity-check nodes that exclude the potential for having "a" in multiple values. FIG. 3 illustrates an example of a bipartite graph 300 based on such a procedure. In the example of FIG. 3, in such a model, if there are the following assertions:

X: assert(a==5 b==1);
Y: assert(a==7 and b==2);
Z: assert(a==1 or b==1);
T: assert(a==5 xor a==7 xor a==1); and
K: assert(b==2 xor b==1), the bipartite graph of FIG. 3 may be drawn where a first layer of nodes X, Y, Z, T, and K represents assertions 302 and a second layer of nodes a and b represents record fields 110. As previously noted, the representation of assertions 302 and record fields 110 have similarities with low-density parity-check (LDPC) code representations, as will be discussed further herein.

Thus, in embodiments, once the model has been defined, a configuration file may be mapped to a parity-check graph. In configurations, a LDPC decoding technique (belief propagation for example) may be applied to make the bipartite graph "happy," e.g., applying the LDPC decoding techniques is used to satisfy all of the validation nodes. The output of such a procedure results in a set of changes/fixes to the data bits for moving from configuration state version 104*a* to configuration state version 104*b*. These changes may then be translated (by inverse mapping) to recreate some field value according to the binary value. The fields may then be fixed accordingly (setting them to default if needed or setting them to a specific value in the instances when fields may have a multiple value).

Figure 4:
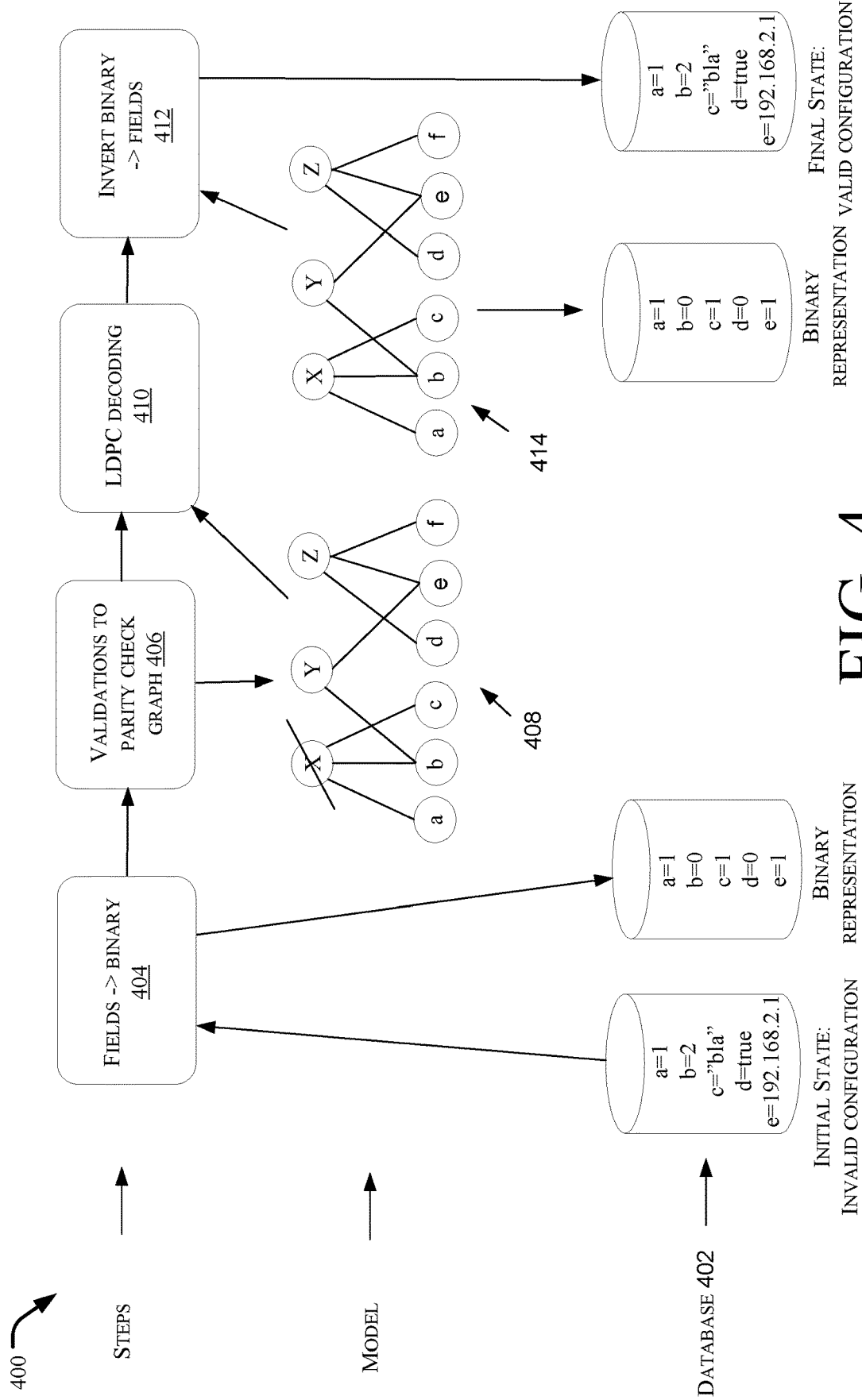
FIG. 4 schematically illustrates a process of applying LDPC decoding to a validation bipartite graph.

In particular, as can be seen in FIG. 4, an example 400 of the LDPC decoding technique may involve obtaining record fields, e.g., record fields 110, from a database 402, where the record fields are resulting in an invalid configuration state, e.g., an invalid configuration state resulting from moving from configuration state version 104*a* to configuration state version 104*b*. In the example 400, the record fields have values of a==1, b==2, c=="bla", d==true, and e==192.168.2.1.

At 404, the record fields may be transformed into their binary representations. Thus, in the example 400, the binary transformation of the record fields results in a==1, b==0, c==1, d==0, and e==1.

At 406, a validations to parity-check graph 408 may be created, e.g., a bipartite graph as depicted in FIG. 2, may be created. As can be seen in FIG. 4, in the model resulting from the validations to parity-check graph 408, the assertion X is not satisfied. This result is based on configuration state version 104a.

At 410, an LDPC decoding technique may be applied to the validations to parity-check graph 408. The binary results of the LDPC decoding technique at 410 may then be inverted to the record fields at 412. The binary values from the LDPC decoding may be used to create a validations to parity-check graph 414.

In the example 400, the binary representation of the valid record fields results in a 1, b==1, c==1, d==0, and e==1. Because the record field b was causing the assertion X to fail in the validations to parity-check graph 408, the record field b needed to be fixed. By changing the binary representation of the record field from "0" to "1", as can be seen in the model resulting from the validations to parity-check graph 414, the assertion X is now satisfied. This result is based on configuration state version 104b being applied to the record fields a-f of the configuration state version 104a. Thus, the record fields having values of a==1, b==2, c=="bla", d==true, and e==192.168.2.1 results in a final state of a valid configuration. In embodiments, if the new configuration state version 104b adds new record fields are added in addition to, or in place of one or more of record fields a-f, then the new record fields are set to their default values during the modelling.

In embodiments, constraint solvers, e.g., constraint solver code, may be used that include importance tagging for configuration record fields 110, e.g., fields a-f (FIG. 2) and fields a-e (FIG. 3). Constraint solvers, also known as constraint programming, is a paradigm for solving combinatorial problems that draws on a wide range of techniques from artificial intelligence, computer science, and operations research. With constraint solvers, users declaratively state the constraints on the feasible solutions for a set of decision variables. Constraints differ from the common primitives of imperative programming languages in that the constraints do not specify a step or sequence of steps to execute, but rather the properties of a solution to be found. In addition to constraints, users also need to specify a method to solve these constraints. This typically draws upon standard methods like chronological backtracking and constraint propagation but may use customized code such as a problem specific branching heuristic.

Thus, in such embodiments, a constraint solver code is used to work with the configuration validation expressions of the models and provide a set of valid configuration values that satisfy all conditions. The constraint solver code may be tuned to reduce exploration on a given set of parameters such that the changes to some specific critical record fields 110 (that might change the entire purpose of the configuration state 104) are limited or blocked. This may require one more level of tagging for configuration record fields 110. The tagging may be manual, e.g., performed by a user, or automatic. Automatic tagging may improve the result and performance of the constraint solver code. The idea is to assign degrees of importance to configuration record fields 110 automatically. Thus, graphic metrics may be used to define field importance (hence how little a particular record field 110 should be varied in the constraint solving exercise). Examples of graph metrics to use include connectivity degree and betweenness centrality. Both measures indicate how much a node (hence the record field 110) contributes to relationships to other nodes of the bipartite graph, e.g., the bipartite graphs of FIGS. 2 and 3. Thus, the more the record field 110 is connected and relates to other record fields 110 in the validation bipartite graphs, the more the record field 110 is important to check its value to define the entire configuration of the network device 102. This means the node's contribution to what the configuration state is implementing is more extensive than other nodes.

In embodiments, the LDPC decoding may also include importance tagging for configuration fields, e.g., fields a-f (FIG. 2) and fields a-e (FIG. 3). The use of the tagging is applied before executing the LDPC decoding. The tagging may be manual or automatic. Thus, the fields that may be considered significant based on the validation graph properties that one may define will not be considered in the LDPC decoding. Hence, the problem space between the configuration state version 104a and the configuration state version 104a is reduced in size since LDPC decoding may receive a smaller input. Moreover, a less complicated output (e.g., the final configuration) from LDPC decoding may be expected as the key fields that may appear in many relationships may not be processed.

In particular, the process involving the bipartite graphing and LDPC decoding, e.g., the process described in the example 400 of FIG. 4, may be tuned to reduce exploration on a given set of parameters such that the changes to some specific critical record fields 110 (that might change the entire purpose of the configuration state 104) are limited or blocked. This may require one more level of tagging for configuration record fields 110. The tagging may be manual, e.g., performed by a user, or automatic. Automatic tagging may improve the result and performance of the process. As previously noted, the idea is to assign degrees of importance to configuration record fields 110 automatically. Thus, graphic metrics may be used to define record field importance (hence how little a particular record field 110 should be varied in the constraint solving exercise). Examples of graph metrics to use include connectivity degree and betweenness centrality. Both measures indicate how much a node (hence the record field 110) contributes to relationships to other nodes of the bipartite graph, e.g., the bipartite graphs of FIGS. 2 and 3. Thus, the more the record field 110 is connected and relates to other record fields 110 in the validation bipartite graphs, the more the record field 110 is important to check its value to define the entire configuration of the network device 102. This means the node's contribution to what the configuration state is implementing is more extensive than other nodes.

In embodiments, recommended and validated deployment configurations from a provider of the network device 102 may be provided. Thus, in embodiments, an additional possibility may be to introduce new constraints, e.g., assertions 202, 302, that represent the validated configuration options that have been provided by the provider of the network device 102.

Likewise, validated deployment configurations from an owner and/or a user of the network device 102 may be provided. Thus, in embodiments, an additional possibility may be to introduce new constraints, e.g., assertions 202, 302, that represent the validated configuration options that have been provided by the owner and/or user of the network device 102. This can be useful in assuring that validated configurations desired by the owner and/or user of the network device 102 remain valid and in place when updating the configuration state from validation state version 104a to validation state version 104b.

In embodiments, the data modeling language may be a rich data modeling language such as, for example, Yang, Tosca, Hot, etc. Such rich data modeling languages allow for database migration and straightforward translations during database migration. However, if the configuration data modeling language is not a rich data modeling language that allows for translations during database migration, then the constraint solver code may be used to make sure that data fields are within the proper range. Additionally, additional constraints, e.g., asserts, may be introduced into the validation model that represents deployment recommendations.

Thus, the techniques and architecture described herein provide for automatically generating a consistent configuration state version 2 for a network device with no or minimal help from a user and/or from a provider of the network device when updating from a configuration state version 1 to the configuration state version 2. The techniques and architecture also provide for migration from configuration state version 1 to configuration state version 2 when at least some of a configuration state are located in text files that are applied to the network device at start-up of the network device. The techniques include mapping of a configuration model to a parity-check graph for automatic invalid configuration fixing that may be used with LDPC decoding techniques. Two different mapping models from configuration model to binary format for parity-check graph are also provided. Configuration migration problems or invalid startup configuration problems are solved automatically with no feature-specific code or manual interventions.

Figure 5:
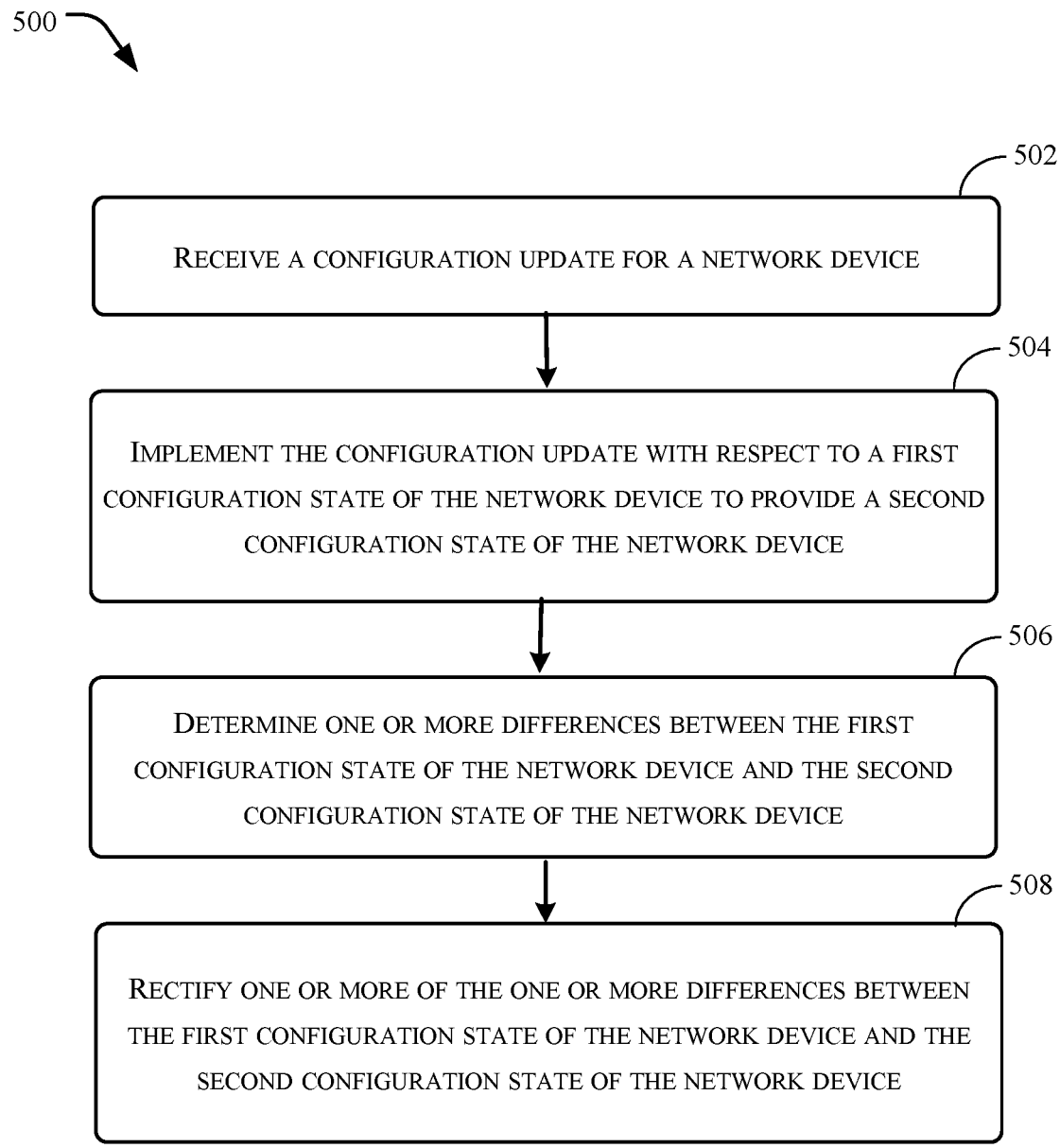
FIG. 5 illustrates a flow diagram of an example method for resolving configurations of network devices in a network.

FIG. 5 illustrates a flow diagram of an example method 300 and illustrates aspects of the functions performed at least partly by a network device of a network as described with respect to FIGS. 1-4. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 5 illustrates a flow diagram of an example method 500 for resolving configurations of network devices in a network. In some examples, the method 500 may be performed by a system comprising one or more processors and one or more non-transitory computer-readable media storing computer-executable instructions that, when executed by the one or more processors, cause the one or more processors to perform the method 500.

At 502, a network device receives a configuration update for the network device. At 504 the network device implements the configuration update with respect to a first configuration state of the network device to provide a second configuration state of the network device. At 506, the network device determines one or more differences between the first configuration state of the network device and the second configuration state of the network device. In embodiments, the one or more differences may be determined by defining validation rules comprising multiple asserts and multiple record fields and mapping the validation rules to a bipartite graph.

At 508, the network device rectifies one or more of the one or more differences between the first configuration state of the network device and the second configuration state of the network device. In embodiments, the one or more of the one or more differences may be rectified by applying low-density parity check (LDPC) decoding to the bipartite graph. In other embodiments, the one or more of the one or more differences may be rectified by applying an automatic constraint solver code to the bipartite graph.

Figure 6:
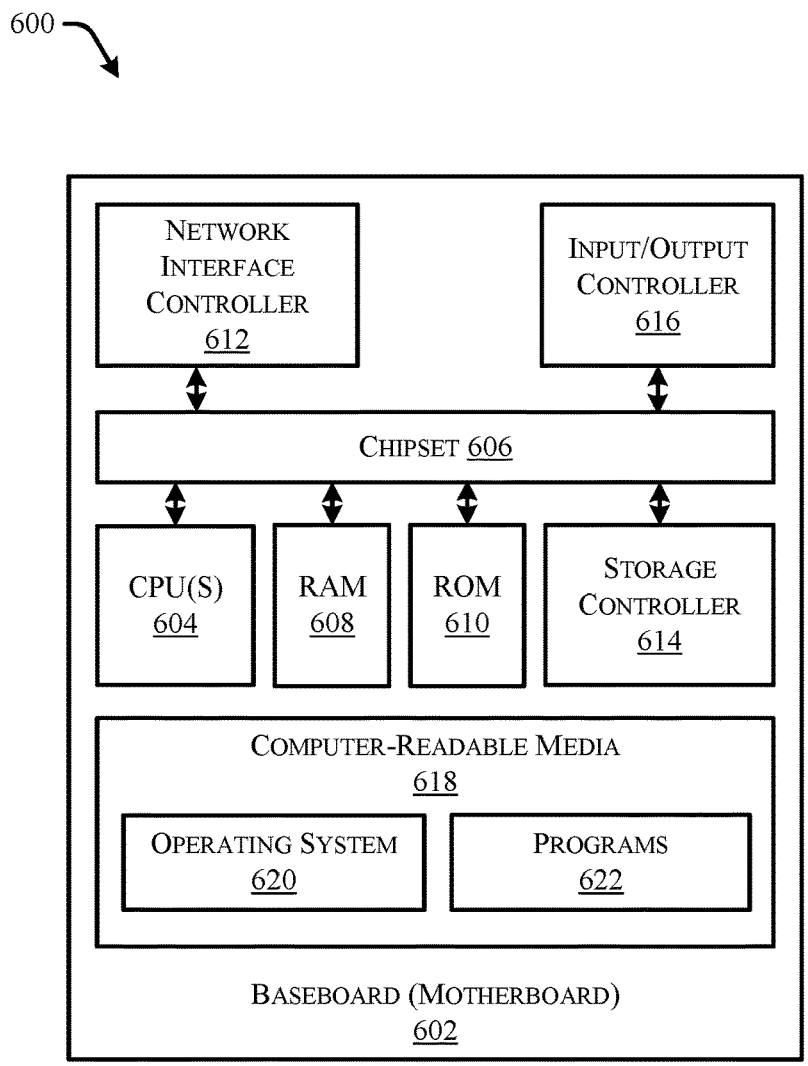
FIG. 6 is a computer architecture diagram showing an illustrative computer hardware architecture for implementing a network device that can be utilized to implement aspects of the various technologies presented herein.

FIG. 6 shows an example computer architecture for a computing device 600 capable of executing program components for implementing the functionality described above. In configurations, the computing device 600 may be used to implement a network device 102, e.g., a router, a switch, a wireless controller, etc. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 600 may, in some examples, correspond to a physical devices or resources described herein.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to start-up the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network, such as the network 100. The chipset 606 can include functionality for providing network connectivity through a NIC 612, such as a gigabit Ethernet adapter. The NIC 612 is capable of connecting the computing device 600 to other computing devices over the network 100. It should be appreciated that multiple NICs 612 can be present in the computing device 600, connecting the computer to other types of networks and remote computer systems.

The computing device 600 can be connected to a storage device 618 that provides non-volatile storage for the computer. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the cloud computing network, and or any components included therein, may be supported by one or more devices similar to computing device 600. Stated otherwise, some or all of the operations described herein may be performed by one or more computing devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIGS. 1-5. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

The computing device 600 may support a virtualization layer, such as one or more virtual resources executing on the computing device 600. In some examples, the virtualization layer may be supported by a hypervisor that provides one or more virtual machines running on the computing device 600 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, at a network device, a configuration update for the network device;
implementing, by the network device, the configuration update with respect to a first configuration state of the network device to provide a second configuration state of the network device;
determining, by the network device, one or more differences between the first configuration state of the network device and the second configuration state of the network device, wherein the determining comprises (i) defining validation rules comprising multiple asserts and multiple record fields and (ii) mapping the validation rules to a bipartite graph;
tagging at least one record field of the first configuration state of the network device with an importance rating, the importance rating providing a degree of variance for the at least one record field with respect to the second configuration state of the network device; and
rectifying, by the network device, one or more of the one or more differences between the first configuration state of the network device and the second configuration state of the network device.

2. The method of claim 1, wherein rectifying one or more of the one or more differences between the first configuration state of the network device and the second configuration state of the network device comprises applying low-density parity check (LDPC) decoding to the bipartite graph.

3. The method of claim 1, wherein at least one record field comprises multiple values.

4. The method of claim 3, wherein rectifying one or more of the one or more differences between the first configuration state of the network device and the second configuration state of the network device comprises applying low-density parity check (LDPC) decoding to the bipartite graph.

5. The method of claim 1,
wherein rectifying one or more of the one or more differences between the first configuration state of the network device and the second configuration state of the network device comprises applying an automatic constraint solver code to the bipartite graph.

6. A system comprising:
one or more processors; and
one or more non-transitory computer-readable media storing computer-executable instructions that, when executed by the one or more processors, cause the one or more processors to perform actions comprising:
receiving a configuration update for a network device that includes the system;
implementing the configuration update with respect to a first configuration state of the network device to provide a second configuration state of the network device;
determining one or more differences between the first configuration state of the network device and the second configuration state of the network device, wherein the determining comprises (i) defining validation rules comprising multiple asserts and multiple record fields and (ii) mapping the validation rules to a bipartite graph;
tagging at least one record field of the first configuration state of the network device with an importance rating, the importance rating providing a degree of variance for the at least one record field with respect to the second configuration state of the network device; and
rectifying one or more of the one or more differences between the first configuration state of the network device and the second configuration state of the network device.

7. The system of claim 6, wherein rectifying one or more of the one or more differences between the first configuration state of the network device and the second configuration state of the network device comprises applying low-density parity check (LDPC) decoding to the bipartite graph.

8. The system of claim 6, wherein at least one record field comprises multiple values.

9. The system of claim 8, wherein rectifying one or more of the one or more differences between the first configuration state of the network device and the second configuration state of the network device comprises applying low-density parity check (LDPC) decoding to the bipartite graph.

10. The system of claim 6,
wherein rectifying one or more of the one or more differences between the first configuration state of the network device and the second configuration state of the network device comprises applying an automatic constraint solver code to the bipartite graph.

11. One or more non-transitory computer-readable media storing computer-executable instructions that, when executed by one or more processors, cause the one or more processors to perform actions comprising:
receiving a configuration update for a network device;
implementing the configuration update with respect to a first configuration state of the network device to provide a second configuration state of the network device;
determining one or more differences between the first configuration state of the network device and the second configuration state of the network device, wherein the determining comprises (i) defining validation rules comprising multiple asserts and multiple record fields and (ii) mapping the validation rules to a bipartite graph;
tagging at least one record field of the first configuration state of the network device with an importance rating, the importance rating providing a degree of variance for the at least one record field with respect to the second configuration state of the network device; and
rectifying one or more of the one or more differences between the first configuration state of the network device and the second configuration state of the network device.

12. The one or more non-transitory computer-readable media of claim 11, wherein rectifying one or more of the one or more differences between the first configuration state of the network device and the second configuration state of the network device comprises applying low-density parity check (LDPC) decoding to the bipartite graph.

13. The one or more non-transitory computer-readable media of claim 11, wherein at least one record field comprises multiple values.

14. The one or more non-transitory computer-readable media of claim 13, wherein rectifying one or more of the one or more differences between the first configuration state of the network device and the second configuration state of the network device comprises applying low-density parity check (LDPC) decoding to the bipartite graph.

15. The one or more non-transitory computer-readable media of claim 11, wherein rectifying one or more of the one or more differences between the first configuration state of the network device and the second configuration state of the network device comprises applying low-density parity check (LDPC) decoding to the bipartite graph.

16. The one or more non-transitory computer-readable media of claim 11, wherein rectifying one or more of the one or more differences between the first configuration state of the network device and the second configuration state of the network device comprises applying an automatic constraint solver code to the bipartite graph.

* * * * *